US006117671A

United States Patent [19]

Yilmaz

[11] Patent Number: 6,117,671

[45] Date of Patent: Sep. 12, 2000

[54] METHOD AND SYSTEM FOR INTEGRATED SOLID WASTE COLLECTION AND MANAGEMENT

[76] Inventor: G. George Yilmaz, 28202 Meadowlark La., Bonita Springs, Fla. 34134

[21] Appl. No.: 09/059,149

[22] Filed: Apr. 13, 1998

[51] Int. Cl.[7] .......... C12S 3/00

[52] U.S. Cl. .......... 435/262; 209/930; 241/24.12; 241/24.13; 241/28; 71/9; 71/10; 71/11; 71/14

[58] Field of Search .......... 435/290.1, 290.2, 435/290.4, 262; 209/930; 241/24.12, 24.13, 28; 71/9, 10, 11, 14

[56] References Cited

U.S. PATENT DOCUMENTS 3,635,409 1/1972 Brewer .......... 241/43

*Primary Examiner*—David A. Redding

[57] ABSTRACT

Solid waste management has been primarily based on collection of solid waste and placing most of it in a landfill. Present invention eliminates a need for large landfills by integrating collection and transportation of solid waste with separation, treatment, processing, recovery, and reuse of solid waste prior to landfill application. Since untreated organic waste is eliminated or significantly reduced from solid waste stream, present invention eliminates a need for daily cover and working front of landfills resulting in elimination of extensive leachate and gas management systems and associated potential groundwater and air pollution problems.

7 Claims, 8 Drawing Sheets

METHOD AND SYSTEM FOR INTEGRATED SOLID WASTE COLLECTION AND MANAGEMENT

FIELD OF THE INVENTION

The present invention lies in the field of civil engineering and more particularly in solid waste management and landfills.

BACKGROUND OF THE INVENTION

Solid waste management has been primarily based on collection of solid waste and placing most if not all of it in a landfill. Present invention eliminates a need for large landfills by separating and preparing solid waste during transportation and processing said solid waste for reuse prior to landfill application. Using present invention current and future landfill sites can be used for solid waste treatment and processing resulting in a number of benefits including elimination of open working front of a landfill operation and associated odor and leachate problems. Voluminous prior art reviewed showed improving large landfills and solid waste management by means of landfill reclamation, landfill mining, landfill bioreactors and recovery. However, prior art reviewed did not demonstrate a novel approach that will integrate collection and processing of solid waste which will result in elimination of large landfills. Some examples of voluminous prior art on processing and disposal of solid waste management are summarized below.

U.S. Pat. No. 1,329,105 discloses an apparatus for solid waste disposal and treatment in tower like structures having a number of chambers which air conduits extent vertically through said chambers.

U.S. Pat. No. 1,832,179 discloses treatment of organic refuse into useful substances by injecting air into moistened refuse.

U.S. Pat No. 2,798,800 discloses a process which includes windrow referred as pile of unsegregated municipal refuse. The windrow is tumbled to provide necessary oxygen within said windrow to support aerobic process as needed.

U.S. Pat. No. 3,298,821 discloses a method and apparatus for decomposing waste material by aerobic process which is promoted and optimized by conditions designed for aerobic bacterial activity.

U.S. Pat. No. 3,419,377 discloses a method for treating organic and inorganic waste material. Said material is pulverized, mixed, and moistened to start fermentation prior to a digester chamber.

U.S. Pat. No. 4,844,813 discloses a system and process for treatment of biodegradable waste which includes a land treatment area underlain by an impermeable layer and surrounded by dikes. A leachate collection system permits effluent collection and routes said effluent to a wastewater treatment system.

U.S. Pat. No. 4,543,016 discloses underground leachate barrier and method which includes digging a trench adjacent a contaminated area, placing a liquid impervious membrane on one side of said trench, and positioning drain pipe and risers surrounded by filter gravel within said trench.

U.S. Pat. No. 5,078,882 discloses bioconversion reactor and system which is claimed to be useful for the biological transformation of waste material into ecologically desirable materials. Said system is referred and defined as a group of zones including bioreactor zone, solids ecoreactor zone, georeactor zone, all of which said zones are interconnected. Said system includes wetlands, marshes, wastes land filled under soil like material with marsh plants.

U.S. Pat. No. 5,201,609 discloses cellular landfill process and apparatus wherein solid waste are disposed of in a landfill repository that maintains them in a dry state indefinitely using water and gas tight cells.

U.S. Pat. No. 5,265,979 discloses a high efficiency waste placement system for municipal landfills which includes shredding the solid waste, adjusting the moisture of the waste, installing an aeration system in a configured pile of said solid waste, covering the pile for aerobic decomposition, compacting the waste pile to be covered with a synthetic cover.

U.S. Pat. No. 5,348,422 discloses method for the formation and operation of in situ process reactor using a mobile trenching machine which converts a contaminated site to a reactor by simultaneously placing contaminant impermeable walls while processing excavated materials such as adding reactor reagents.

U.S. Pat. No. 5,356,452 discloses a method and apparatus for reclaiming waste materials. Waste materials are placed over impermeable liner in a domed structure. The decomposition of the waste material is controlled and monitored and after a period of time, the material within one or more cells is recovered and recycled.

U.S. Pat. No. 5,429,454 discloses a method for landfill reclamation which primarily includes excavation of waste materials from a landfill, separation of excavated waste materials, recovery of recyclable from excavated waste materials, and placing unrecoverable excavated waste materials back into the landfill.

U.S. Pat. No. 5,564,862 discloses a method of improved landfill mining which comprises converting the landfill to aerobic production by injection of air, moisture, and sludge for increased rate of decomposition, and excavating the landfill to remove waste materials, separating the removed waste material, and returning the residual to the landfill.

Prior art reviewed as summarized above do not demonstrate a new comprehensive novel method and apparatus which will eliminate a concept of large landfills. Present invention integrates collection and transportation of solid waste with treatment, processing, recovery, and reuse of solid waste. As a result, solid waste is converted into two primary groups of wet organic waste and dry waste most of which can be processed for reuse prior to landfill application. Therefore, using present invention permanently placed large landfills which become a continuous environmental, economical, and public health threat to the surrounding communities are eliminated by means of integrating collection and processing of solid waste. Although it is preferred to eliminate large landfill sites, present invention may be used in association with or as a part of a landfill site depending on the waste stream and market conditions. One of the primary benefits of using present invention is elimination of open working front of landfill operations and all associated odor and leachate problems related to wet organic waste portion of solid waste.

SUMMARY OF THE INVENTION

Solid waste management has been primarily based on collection of solid waste and placing it in a landfill which has to be continuously monitored and maintained. Present invention eliminates a need for large landfills by separating and processing solid waste for reuse prior to landfill application. Present invention integrates collection and transportation of solid waste with separation, treatment, processing, recovery, and reuse of solid waste. Using present invention current and future landfill sites can be primarily utilized for advanced solid waste treatment and processing which eliminates a number of problems associated with landfill operations such as odor and leachate problems. Solid waste is preferred to be separated into at least two primary groups of wet organic waste and dry waste most of which can be processed and recovered before it goes to a landfill. As a result, large landfills are eliminated which become a continuous environmental, economical, and social threat to the surrounding communities.

Prior art reviewed demonstrated that a number of methods and apparatus which improved a concept of large landfills which consist of burying solid waste under controlled environmental conditions and long term monitoring of said conditions. However, prior art reviewed does not demonstrate a new comprehensive novel method and apparatus which will eliminate a concept of large landfills. Present invention makes collection and transportation of solid waste, a significant part of treatment, processing, recovery, and reuse prior to landfill application. A portion of said solid waste which is not recovered and reused is disposed in a small landfill or stored for further processing.

Solid waste is collected and transported as dry waste and wet organic waste most of which are separated at source and prepared and initially processed during the transportation. Said dry waste and wet organic waste are accepted by dry waste processing and wet organic waste processing respectively. Dry waste processing includes recovery and reuse of cellulose based materials such as paper, plastics such as high and low density plastics, yard waste such as grass clippings and trees, construction demolition materials such as concrete and iron bars, rubber and petroleum product material such as tires and geotextile. Wet organic waste processing includes recovery and reuse of mostly household kitchen waste, sludge from household septic tanks or other sources, and other wet organic waste such as waste from food and drink processing facilities with high BOD demand such as restaurants and hotels. Since most of the solid waste is processed and prepared for reuse prior to landfilling, only a small portion of solid waste is left for landfilling or further processing for reuse. Although it is preferred to eliminate large landfill sites, present invention may be used in association with or as a part of a landfill site depending on the waste stream and market conditions. One of the benefits of using the present invention is elimination of open working front of landfill operations and associated odor and leachate problems related to wet organic waste portion of solid waste. The following is a partial list of benefits of the present invention:

1. wet organic waste portion of solid waste is separated and processed for reuse and is not buried as untreated wet organic waste in a landfill or bioreactor;

2. dry waste portion of solid waste is separated and processed for reuse and is not buried in a landfill or bioreactor;

3. large quantities of daily cover material for landfills are not needed resulting in cost reductions;

4. working front of a landfill is eliminated or significantly reduced resulting in elimination of odor;

5. local political considerations and challenges such as relocation of existing landfills due to odor problems are more easily met or overcome;

6. extensive leachate management systems for organic compounds are eliminated or significantly reduced resulting in better groundwater and surface water pollution control;

7. extensive gas management systems are not needed since generation of gases are eliminated or significantly reduced resulting in associated cost reductions;

8. curbside recycling is eliminated resulting in opportunities for more frequent solid waste collection events with less complicated collection schedules. However, present invention allows such recycling programs where it is found to be cost effective;

9. organic waste such as household and restaurant food waste, dry waste such as paper, glass, metals, plastics, and botanic waste such as yard waste can be concurrently collected using present invention's transportation and preparation unit which combines collection events for different solid waste groups;

10. the present invention therefore combines different collection events for different solid waste groups into one collection event creating opportunities for better and improved service such as more frequent solid waste collection events. Since large portion of the solid waste disposal fees are to pay for collection and transportation, the present invention is expected to increase service levels and reduce overall cost of solid waste management.

DETAILED DESCRIPTION OF THE PREFERRED EMBODIMENTS

Figure 1:
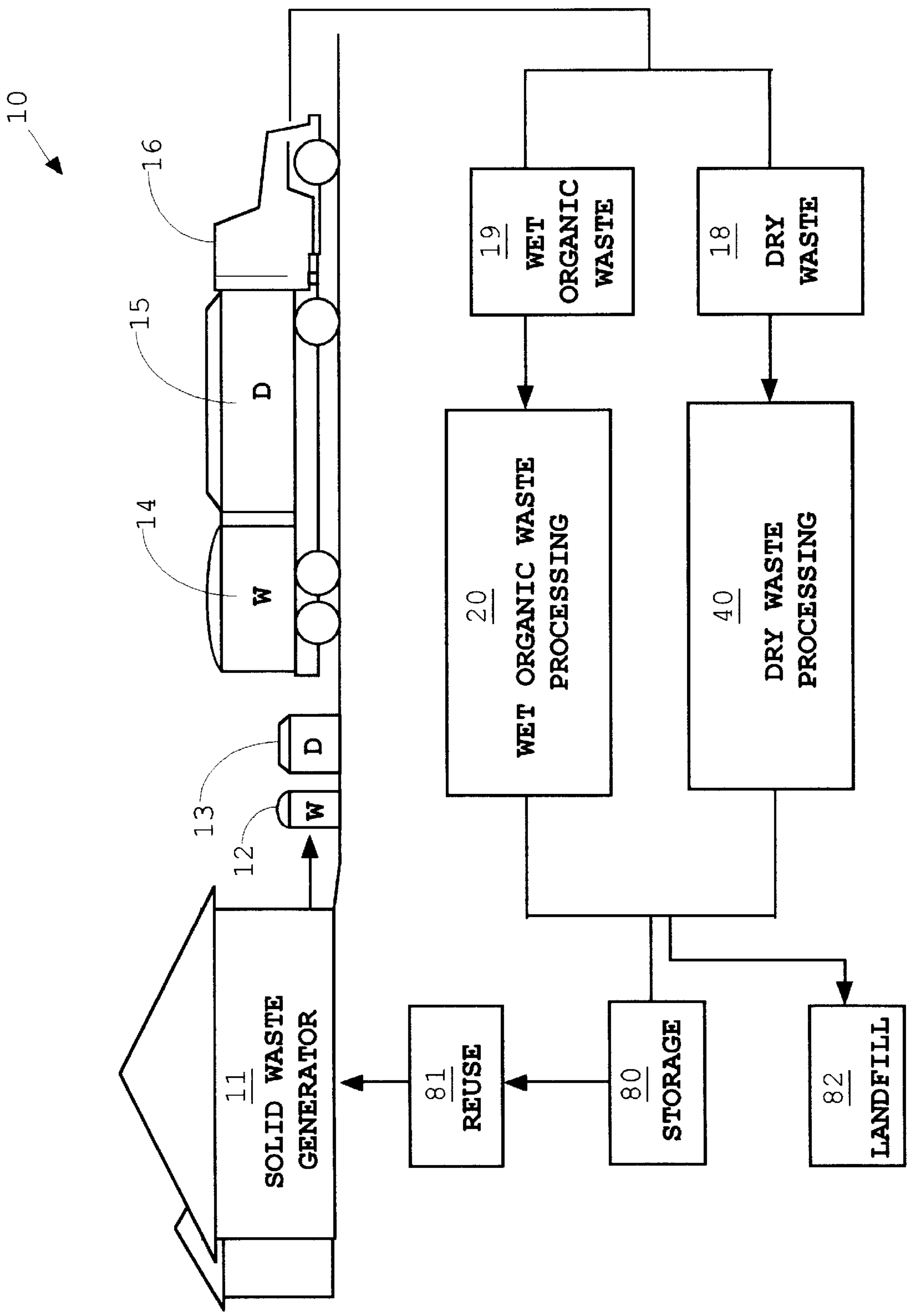
FIG. 1 shows a process chart of the present invention including a solid waste generator, wet organic waste and dry waste generator containers, a transportation and preparation unit.

FIG. 1 shows process chart 10 including summary of the present invention showing a solid waste generator 11, preferred separation of solid waste into groups of at least wet organic waste 19 and dry waste 18 as initially contained in a wet organic waste generator container 12 and a dry waste generator container 13 respectively, a transportation and preparation unit 16, wet organic waste processing 20, and dry waste processing 40. Said transportation and preparation unit 16 is preferred to have two transportation containers 14 and 15 for wet organic waste 19 and dry waste 18 respectively for the purpose of preparation and initial processing. Wet organic waste 19 is prepared through processing 20 for storage 80 and reuse 81. Dry waste 18 is prepared through processing 40 for storage 80 and reuse 81. Any waste which can not be cost effectively processed for reuse is stored or deposited in a small landfill or bioreactor 82.

Figure 2:
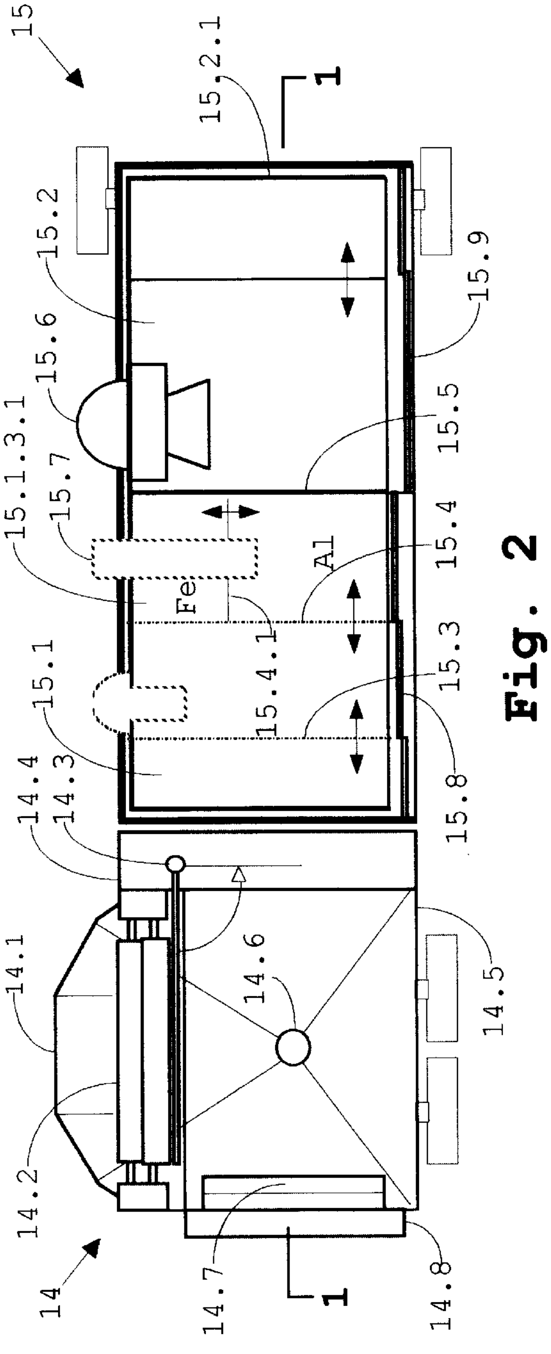
FIG. 2 shows a top view of a transportation and preparation unit.
Figure 3:
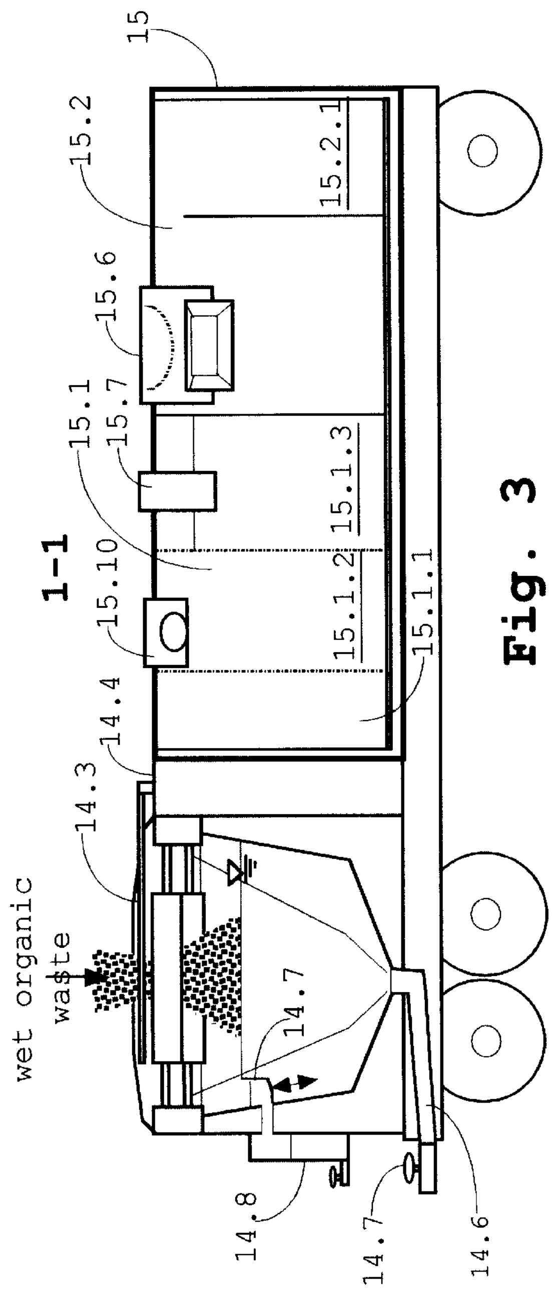
FIG. 3 shows a cross section view of a transportation and preparation unit.

FIG. 2 and FIG. 3 show a top view and a cross section of a transportation and preparation unit 16 which include wet organic waste and dry waste transportation containers 14 and 15 respectively. Wet organic waste transportation container 14 and dry waste transportation container 15 receives waste from wet organic waste generator container 12 and dry waste generator container 13 respectively. Preparation and initial processing of wet organic waste 19 is primarily achieved during collection and transportation as follows. Wet organic waste 19 is accepted through feeder 14.1 and prepared by transportation grinder 14.2 while being watered by transportation fluid delivery unit which consist of a transportation watering unit 14.3 connected to a water tank 14.4. Said transportation watering unit 14.3 is positioned and utilized as needed. Said transportation fluid delivery unit allows biological, physical, or chemical supplements such as selected microorganisms, pH regulators, nutrients, oxygen to facilitate desired transportation conditions including preparation and initial processing of wet organic waste 19. Said waste 19 and water with or without said supplements are contained in a transportation storage container 14.5. Wet organic waste transportation container 14 also allows installation of an adjustable skimmer 14.7 and grease trap 14.8 to separate grease during transportation or at rest or between operations of said grinder 14.2. Remaining portion of wet organic waste 19 is discharged using 14.6 and valve 14.7. to be received by said wet organic waste processing 20. Said organic waste transportation container 14 is aerobic or anaerobic and is connected to said transportation and preparation unit 16.

Figure 5:
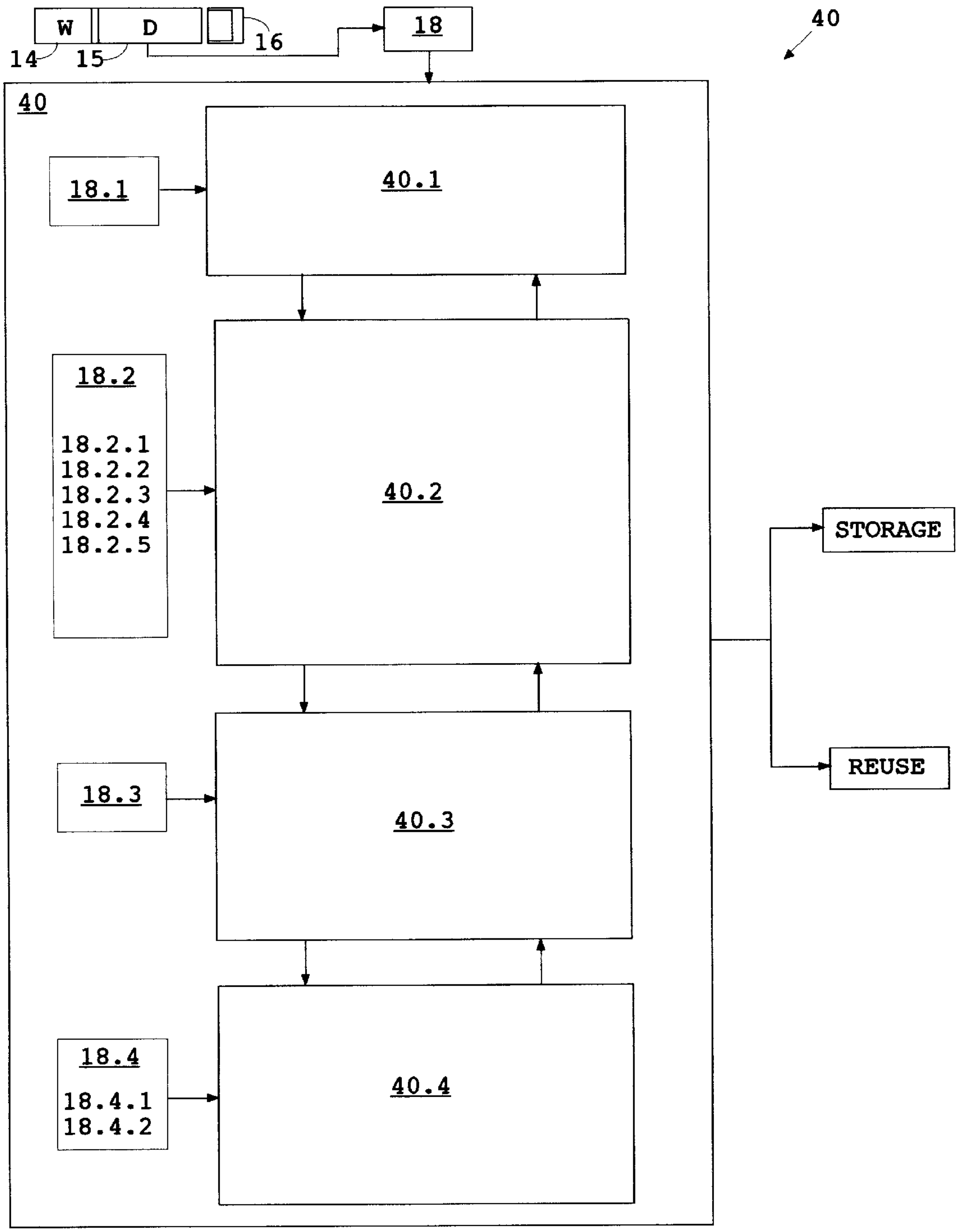
FIG. 5 shows processing of dry waste portion of solid waste for reuse including connected systems.

Preparation and initial processing of dry waste 18 is primarily achieved during collection and transportation as much as possible. Dry waste 18 is defined by at least four primary groups of dry waste which are construction waste group 18.1, combined dry waste group 18.2, elastic waste group 18.3 and botanic waste group 18.4 as shown in FIG. 5. Most frequently collected solid waste groups are wet organic waste 19 and dry waste groups 18.2 and 18.4 all of which can be simultaneously collected using transportation and preparation unit 16 consisting of wet organic waste and dry waste transportation containers 14 and 15 respectively. The present invention therefore combines three different collection events into one collection event creating opportunities for more frequent collections and savings associated with less frequent collection events. Dry waste transportation container 15 receives dry waste 18 from generator container 13. Dry waste transportation container 15 consist of at least two primary sections of combined dry waste section 15.1 for combined dry waste group 18.2 and botanic waste section 15.2 for botanic waste group 18.4 respectively as shown in FIG. 2 and FIG. 3. Elastic waste group 18.4 and construction waste group 18.1 are transported using a transportation container 15 which allows sections for different types of dry waste. Dry waste transportation container 15 and sections of said container 15 such as section 15.2 allows transportation preparation and initial processing units such as wood chipper and cutter 15.6 to be installed. Said wood chipper and cutter 15.6 is for preparation and initial processing of botanic waste group 18.4. Said section 15.2 also allows an adjustable sub section 15.2.1 for grass clippings or similar botanic waste. Dry waste transportation container 15 and combined dry waste section 15.1 allows multiple adjustable sub sections such as 15.1.1, 15.1.2, 15.1.3 using adjustable partitions such as 15.3, 15.4, and 15.5 respectively for the purpose of optimizing space and segregating combined dry waste group 18.2 as a function of waste stream such as paper waste, plastic waste, glass waste, and metal waste. Said sub sections such as 15.1.3 and 15.1.2 also allow installation of a transportation preparation and initial processing units such as magnetic separator 15.7 and a transportation air knife 15.10 for preparation and initial processing. A transportation magnetic separator 15.7 is for separation of metal waste into ferrous and non ferrous materials such as aluminum and iron during collection and transportation. A transportation air knife 15.10 is for separation of light waste materials such as paper and plastic, and heavier waste materials such as wood, metals, and glass. Although preferred to be segregated where cost effective, dry waste 18 can be collected and transported without segregation as a combined dry waste group 18.2 and botanical waste group 18.4 using 15.1 and 15.2 respectively. Said waste groups 18.2 and 18.4 are discharged from sections 15.1 and 15.2 using adjustable doors 15.8 and 15.9. Said adjustable doors also allows openings for sub sections such as 15.1.1, 15.1.2, and 15.1.3. as needed. Dry waste 18 is further segregated as a part of dry waste processing 40 for reuse. Local conditions and characteristics of the waste stream would be one of the primary selection criteria for above mentioned options of combined or segregated dry waste collection and transportation.

Figure 4:
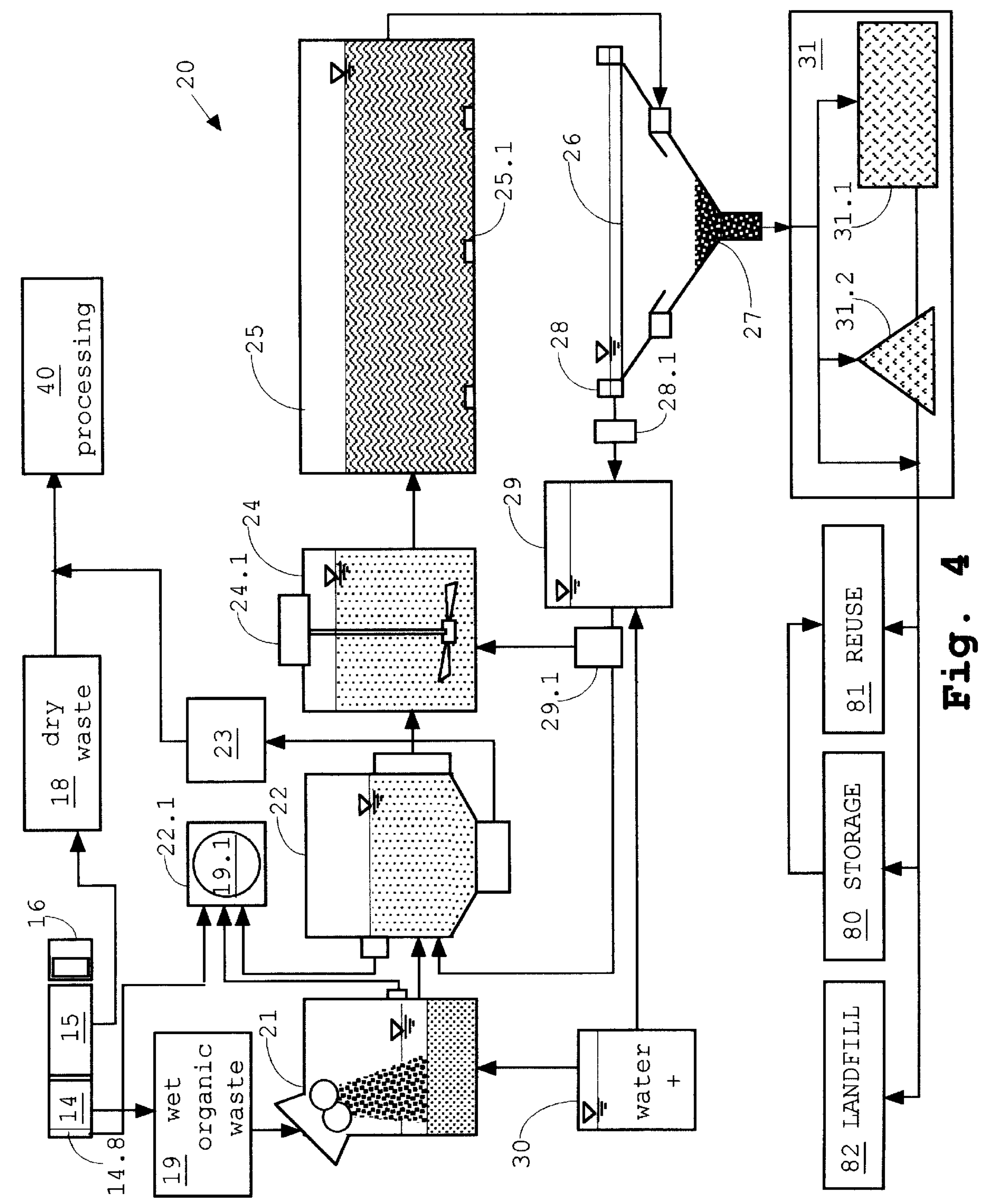
FIG. 4 shows processing of wet organic waste portion of solid waste for reuse including fluid tanks and connected systems.

FIG. 4 shows a plan view wet organic waste processing 20 of the present invention including processing and storage of wet organic waste for reuse. Wet organic waste 19 from 14 is accepted by grinding unit 21 to which fluid mostly water and supplements such as one or combination of biological, physical, and chemical additives are added from a primary fluid tank 30. Said supplements are added to facilitate and effect desired biological, physical, and chemical conditions. Wet organic waste 19 is received from 21 by density filtering unit 22 and mixed with additional fluid from a secondary fluid tank 29. Said waste 19 is separated and filtered as a function of density using said density filtering unit 22. Grease 19.1 or other undesired waste such as ferrous, aluminum, plastic are as much as possible separated from wet organic waste 19. Grease 19.1 is collected in 22.1 and said other waste are transported to dryer unit 23 to be dewatered as needed and then accepted by dry waste processing 40. Grease 19.1 is also separated and collected from 21 and 14.8 and contained in 22.1 for reuse as desired. Remaining wet organic waste is accepted by mixing unit 24 where additional fluid mostly water from secondary fluid tank 29 is added and thoroughly mixed using a mixer 24.1 then accepted by organic reduction unit 25 which reduces wet organic waste to organic solids where organic waste reduction is achieved using anaerobic or preferred rapid aerobic method using a number of aerators 25.1. A settling unit 26 receives wet organic waste and fluid mostly water from 25 and separates and settles organic solids in 27 and also separates and clarifies fluid using 28 and collects the fluid in secondary fluid tank 29 for recycling or reuse. Optional filtering can be achieved using supplementary filters such as 28.1 and 29.1 before and after said tank 29. Settled organic solids in 27 is received by conditioning unit 31 for processing for reuse such as soil conditioning products and mulch. Said conditioning unit 31 includes at least two primary units of dewatering unit 31.1 such as drying beds and wet organic compost unit 31.2. Said conditioning unit 31 is utilized as needed for processing said settled organic solids to be stored in storage unit 80 for reuse 81 or placed in a landfill 82 as needed.

FIG. 5 shows dry waste processing 40 including interconnected processing for dry waste groups. Dry waste 18 is preferred to be separated into five primary groups of 18.1, 18.2, 18.3, and 18.4 for processing and reuse prior to landfill application.

Figure 6:
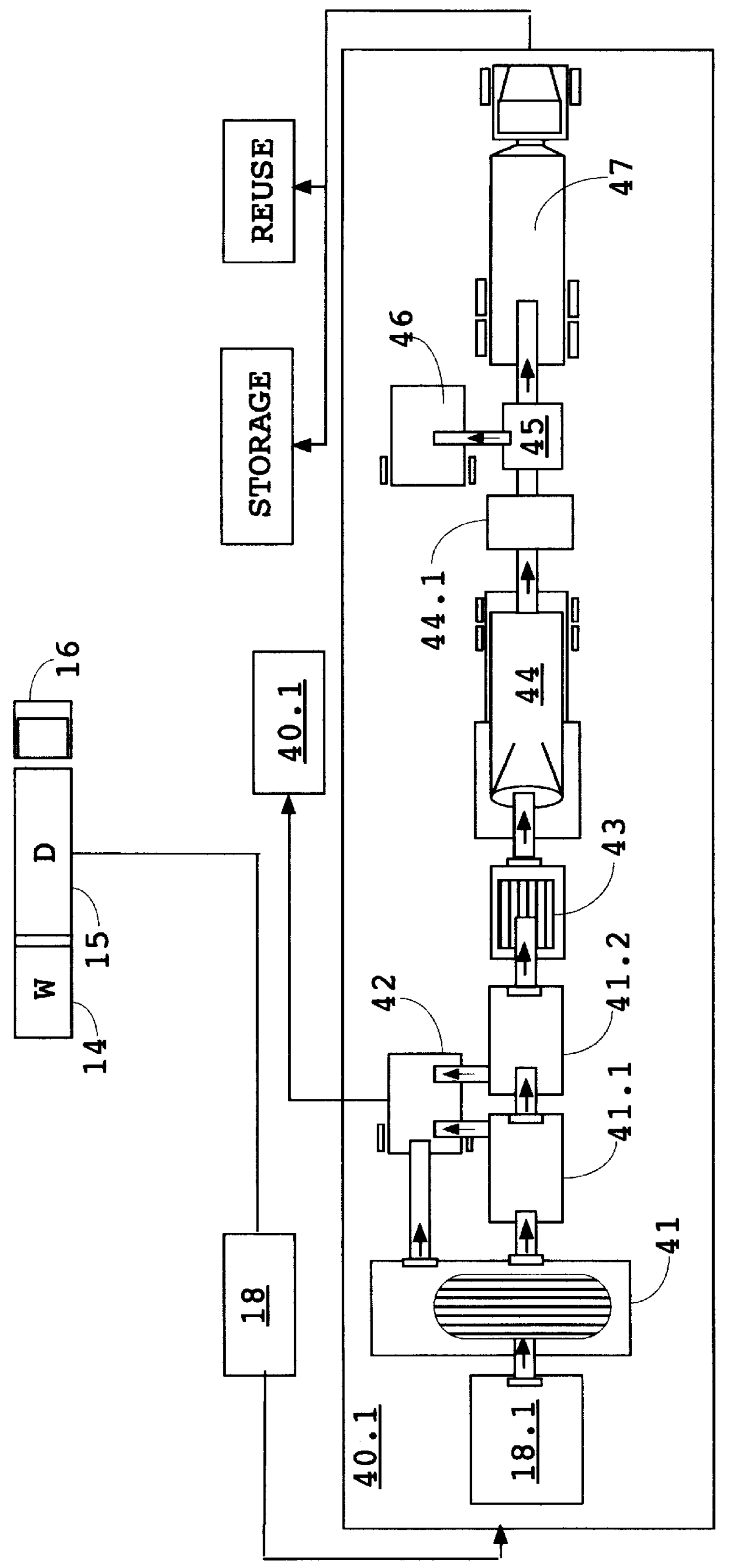
FIG. 6 shows processing construction waste group of dry waste portion of solid waste for reuse.

A construction waste separation and processing unit 40.1 receives construction waste group 18.1. as shown in FIG. 5 and FIG. 6. Primary segregation platform 41 separates said waste group 18.1 into 18.2.1, 18.2.2, 18.2.3, 18.2.4, and 18.2.5 all of which are sent to processing 40.2 as needed using 42. Cutting unit 41.1 breaks remaining large pieces of dry waste 18.1 into smaller which then goes to construction waste post segregation unit 41.2 where metals and plastics and wood are separated in mobile container 42 for further processing using processing 40.2. Remaining portion of said dry waste 18.1 is crushed using multi layer crushing unit 43 for further size reductions as desired and send to hammermill unit 44. Aggregate chips from said hammermill unit 44 is decontaminated using construction waste decontamination unit 44.1 and separated into different size products using multi screen 45 and sent to mobile container 46 for further processing using processing 40.2 or send to 47 for reuse.

Figure 7:
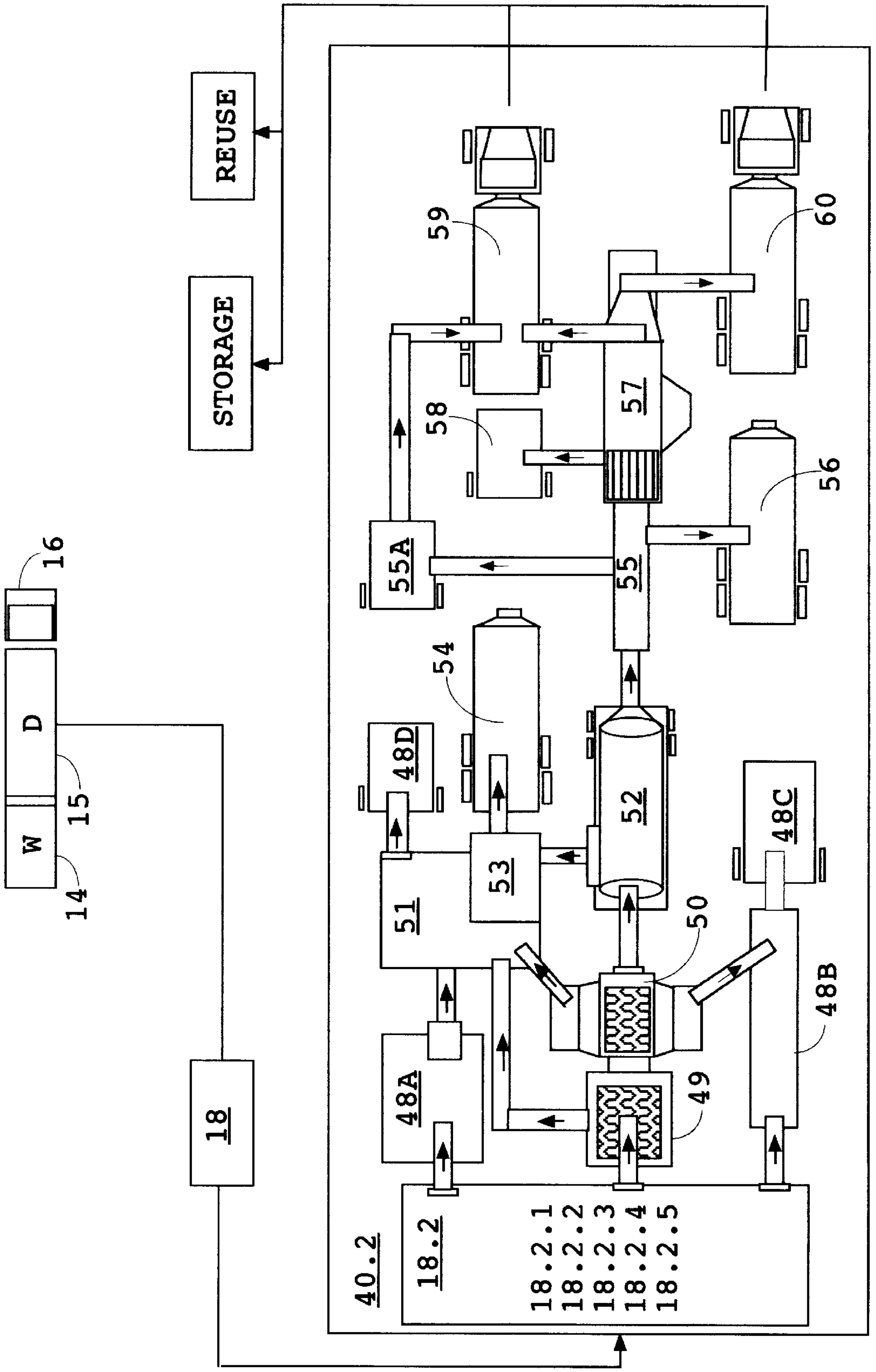
FIG. 7 shows processing combined waste group of dry waste portion of solid waste for reuse.

A combined dry waste group 18.2 which consist of at least one or more of aggregate waste 18.2.1 and plastic waste 18.2.2 and metal waste 18.2.3 such as ferrous and aluminum waste and glass waste 18.2.4 and white goods 18.2.5., as shown in FIG. 5 and FIG. 7., is separated and processed using combined dry waste processing unit 40.2. White goods 18.2.5 are separated as much as possible using separator platform 48B and accepted by mobile container 48C. Using separator platform 48A, ready portion of waste 18.2 is segregated as much as possible and send directly to primary decontamination unit 51 to be accepted by mobile container 48D. Remaining of said combined waste 18.2 is accepted by primary grizzly dynamic screen 49 and secondary grizzly dynamic screen 50. Most of the loose aggregate portion of said combined waste is captured and separated by said primary and secondary grizzly dynamic screen 49 and 50 respectively and send to primary decontamination unit 51 which is connected to secondary soil decontamination unit 53. Said units 51 and 53 are to eliminate potential contaminants such as hydrocarbons and heavy metals. Remaining portion of said combined waste is accepted by multi screen trommel 52 through which all remaining aggregate waste is separated and send to secondary soil decontamination unit 53 and accepted by mobile storage unit 54 for reuse. All remaining portion of said combined waste passes through said trommel 52 and accepted by magnetic separator 55 which collects ferrous portion of metal waste 18.2.3 which is accepted in mobile storage 56 for reuse. Using said separator 55, glass waste 18.2.5 is also collected by mobile container 55A. An air knife 57 separates plastic waste 18.2.2 and remaining non ferrous portion of metal waste 18.2.3 and remaining glass waste 18.2.5 which are collected in mobile storage 60, 59 and 55A respectively for reuse.

Figure 8:
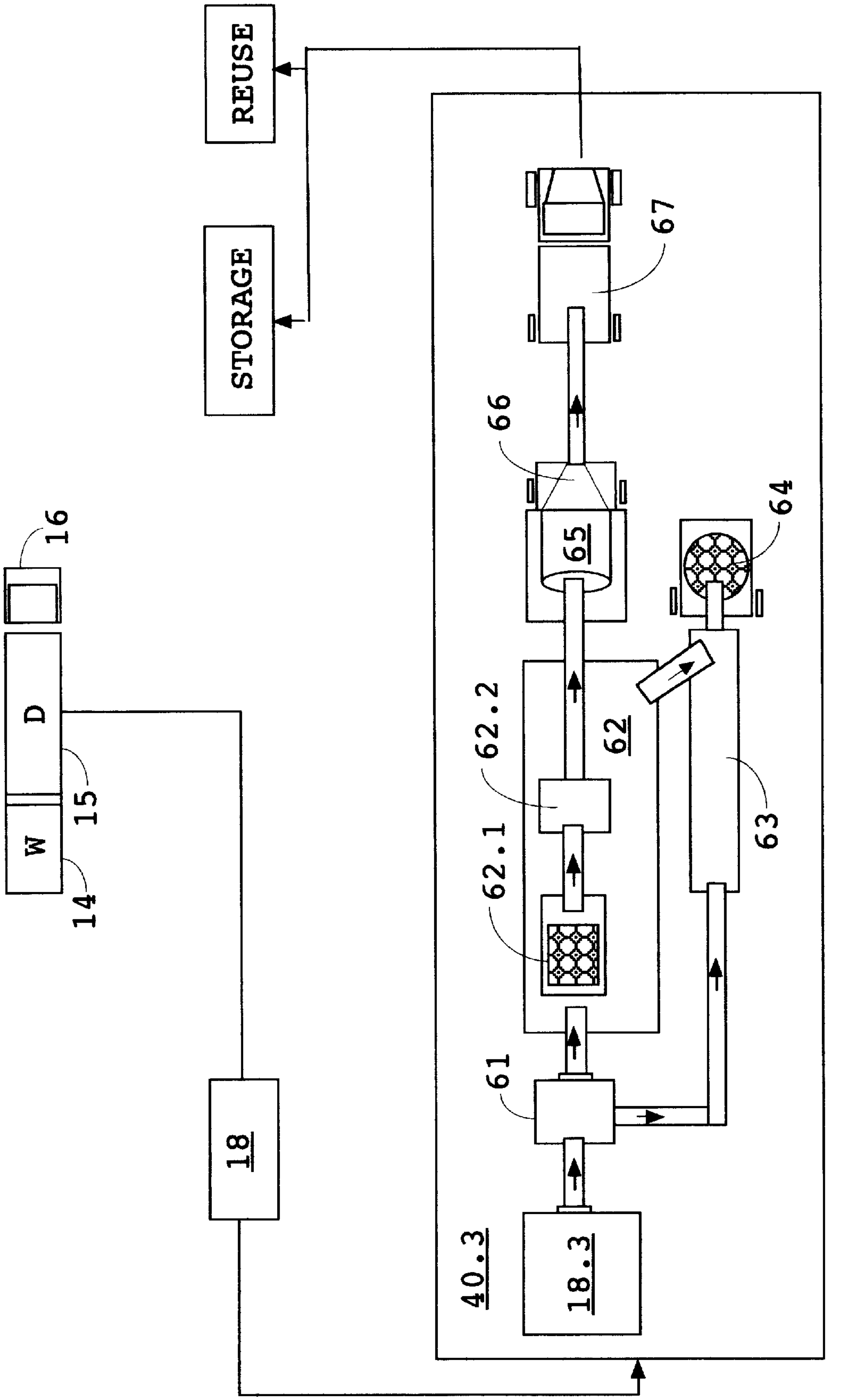
FIG. 8 shows processing elastic waste group of dry waste portion of solid waste for reuse.
Figure 9:
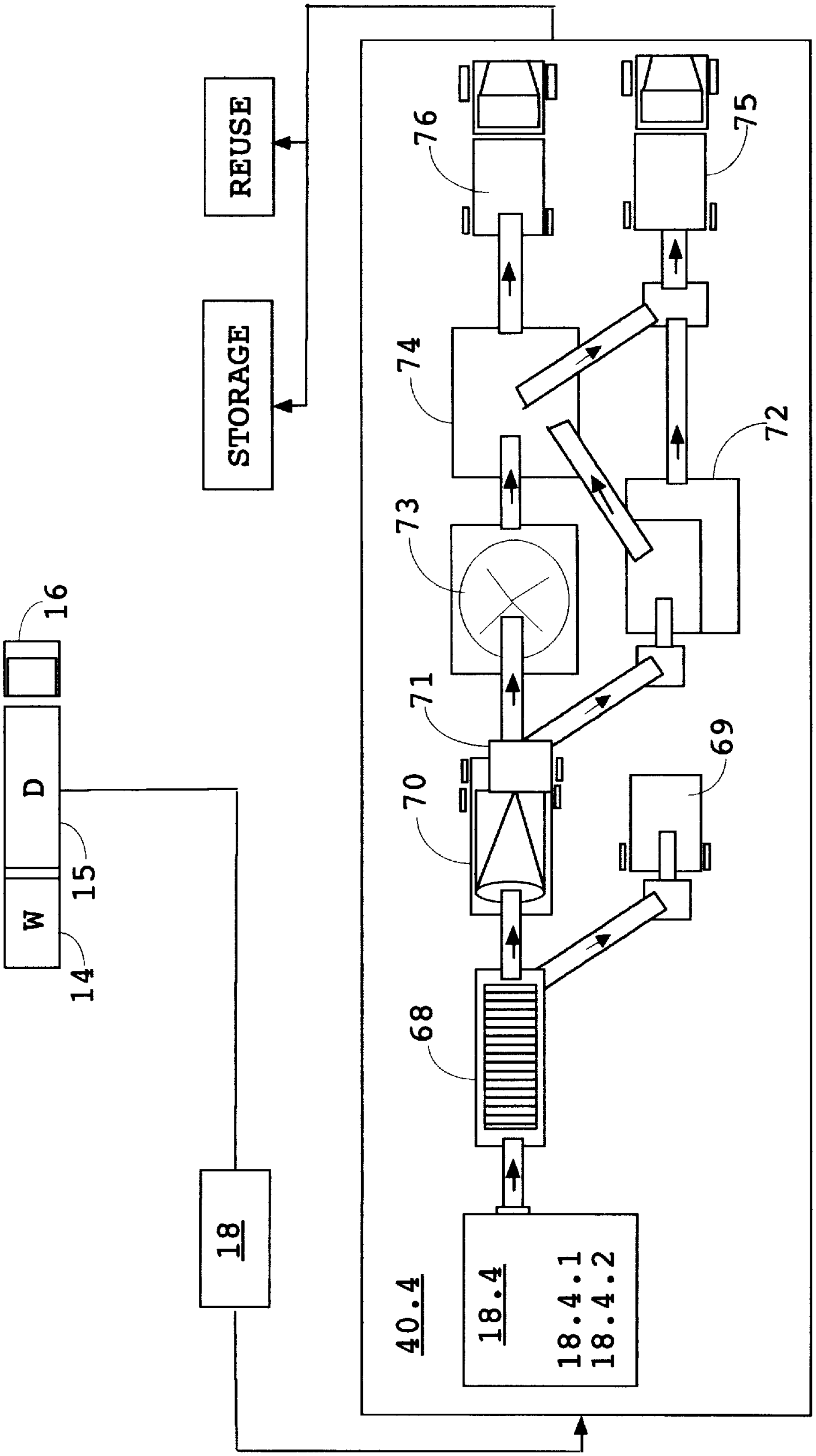
FIG. 9 shows processing botanical waste group of dry waste portion of solid waste for reuse.

An elastic waste separation and processing unit 40.3 accepts elastic waste group such as tire waste 18.3 as shown in FIG. 5 and FIG. 8. A portion of said tire waste is selected using tire preselection and post selection units 61 and 63 respectively and contained in 64 for resurfacing or reuse as whole tire. Processing unit 62 consist of prewash unit 62.1 and tire decontamination unit 62.2. Remaining portion of said tire waste is accepted by cross knife chipper 65 for processing and reduced to desired different sizes and collected in a mobile storage 67 for reuse.

a botanical waste separation and processing unit 40.4 receives botanical waste group 18.4 consisting of at least yard waste 18.4.1 such as grass clippings, tree trims, and wood waste 18.4.2 such as trees and wood from land clearing activities as shown in FIG. 5 and FIG. 9. All reusable wood is recovered using separation platform 68 and sent to a mobile storage 69. Remaining portion of the said waste group is sent to tree and multi-grade wood chipper 70 to be reduced to desired sizes and segregated using botanic multi grade screen 71 for composting 73 or mulch storage 72. A botanic decontamination unit 74 is used as needed for biological, chemical, or physical decontamination. Different grades of mulch from 74 or composting 73, and mulch storage 72 are accepted as needed by mobile storage 75 or 76 for reuse.

While I have fully shown and described embodiments of my method and apparatus for integrated solid waste collection and management no limitations as to the scope of the present invention should be implied from the foregoing description. The true scope of the present invention is limited only by the following claims.

I claim:

1. A method of operating a waste management system which integrates collection and transportation of waste with separation, treatment, processing, recovery, and reuse of waste comprising:

separating said waste into groups of at least wet organic waste and dry waste, collecting said wet organic waste and dry waste, transporting, in separate compartments or containers of a transportation and preparation sub-system, said wet organic waste and dry waste, preparation and treatment and processing of said wet organic waste for mass reduction and recovery and reuse, and preparation and treatment and processing of said dry waste for recovery and reuse.

2. A method as set forth in claim 1 for collection and transportation of solid waste comprising separation of solid waste into groups of at least wet organic waste and dry waste, collection of solid waste by said wet organic waste and dry waste, transportation of solid waste by said wet organic waste and dry waste, preparation and initial processing of said wet organic waste and dry waste during collection and transportation.

3. A method as set forth in claim 1 wherein said preparation and treatment and processing of said wet organic waste for recovery and reuse comprises:

accepting said wet organic waste from said transportation and preparation sub-system, adding fluid to said wet organic waste to form a mixture, reducing said mixture in size, filtering said mixture by density after said reduction in size, mixing said filtered reduced mixture with additional fluid in which supplements are added, treating said filtered reduced mixture by chemical or biological means including aerobic or anaerobic methods, settling organic solids of said treated mixture leaving a fluid clarified for reuse and storage or disposal, and removing and conditioning said organic solids for processing and storage and reuse prior to landfill application.

4. A method as set forth in claim 1 wherein said subsystem for preparation and processing of wet organic waste during transportation comprises:

containing and initial preparation of said wet organic waste using a feeder section of said transportation container, reducing said wet organic waste using a size reduction section of said transportation container, adding fluid to said reduced wet organic waste to form a mixture, adding one or a combination of biological and chemical supplements to said mixture for mass reduction, skimming grease and oil from said mixture using an adjustable skimmer section of said transportation container, removing said skimmed grease and oil from said mixture using a grease trap section of said transportation container, storing said initially prepared and processed mixture of wet organic waste during transportation.

5. A method of collecting and transporting waste, in separate containers or compartments of a mobile transportation system, comprising:

separating and containing wet organic portion of said waste in a wet waste generator container including all fluid waste, separating and containing dry portion of said waste in a dry waste generator container including dry organic waste and dry inorganic waste, collecting said wet organic portion of said waste contained in said wet waste generator container and collecting said dry portion of said waste contained in said dry waste generator container using said separate mobile transportation system, transporting said wet organic portion of said waste and said dry portion of said waste using said separate mobile transportation system, processing and decontamination of said wet organic portion of said waste and said dry portion of said waste for reuse and storage.

6. A method as set forth in claim 1 wherein said subsystem for preparation and processing of dry waste during transportation comprises:

containing and initial preparation of combined dry waste portion of said waste using a combined dry waste section of said transportation container, containing and initial preparation of botanical waste portion of said waste using a botanical waste section of said transportation container, separating said dry waste using said combined waste section and said botanical waste section which include adjustable multiple sub sections, and processing said separated dry waste in said multiple sub sections during transportation.

7. A method as set forth in claim 1 wherein said preparation, treatment and processing of said dry waste further comprises:

accepting said dry waste from said transportation and preparation sub-system, separating and processing a construction waste portion of said dry waste using a construction waste separation and processing sub-system including decontamination prior to use, separating and processing a combined dry waste portion of said dry waste, including aggregate waste, plastic waste, metal waste, glass waste, and white goods, using a combined dry waste processing sub-system including decontamination for reuse and storage, separating and processing an elastic waste portion of said dry waste, including tires, using an elastic waste separation and processing sub-system including decontamination for reuse and storage, and separating and processing a botanical waste portion of said dry waste, including yard and wood waste, using a botanical waste separation and processing sub-system including decontamination and storage.

* * * * *